(12) United States Patent (10) Patent No.: US 9,434,401 B2
Johnson (45) Date of Patent: Sep. 6, 2016

(54) HARNESS AND PULLING ASSEMBLY

(71) Applicant: New West Analytics Corporation, New Westminster (CA)

(72) Inventor: Jerry Richmond Johnson, New Westminster (CA)

(73) Assignee: New West Analytics Corporation, New Westminster (CA)

( * ) Notice: Subject to any disclaimer, the term of this patent is extended or adjusted under 35 U.S.C. 154(b) by 0 days.

(21) Appl. No.: 14/960,035

(22) Filed: Dec. 4, 2015

(65) Prior Publication Data

US 2016/0159384 A1 Jun. 9, 2016

Related U.S. Application Data

(60) Provisional application No. 62/087,853, filed on Dec. 5, 2014.

(51) Int. Cl.
  *B62B 5/06* (2006.01)
  *B62B 1/10* (2006.01)
  *B62B 5/08* (2006.01)

(52) U.S. Cl.
  CPC .............. *B62B 5/068* (2013.01); *B62B 1/10* (2013.01); *B62B 5/08* (2013.01)

(58) Field of Classification Search
  CPC ...................................................... B62B 5/068
  See application file for complete search history.

(56) References Cited

U.S. PATENT DOCUMENTS

| 367,142 | A | 7/1887 | Heyligenstaedt |
| 660,598 | A | 10/1900 | Stonebridge |
| 2,343,019 | A | 2/1944 | Neal |
| 4,236,723 | A | 12/1980 | Lemmon |
| 4,335,875 | A | 6/1982 | Elkin |
| 4,473,991 | A | 10/1984 | La Mura et al. |
| 4,848,780 | A | 7/1989 | Straub |
| 5,056,301 | A | 10/1991 | Garland et al. |
| 5,062,651 | A | 11/1991 | Varieur |
| 5,106,108 | A | 4/1992 | Howell |
| 5,183,279 | A | 2/1993 | Acerno et al. |
| 5,215,355 | A | * 6/1993 | Klumpjan ............... B62B 5/068 280/1.5 |
| 5,244,217 | A | 9/1993 | Kotulla |
| 5,265,891 | A | 11/1993 | Diehl |
| 5,375,861 | A | 12/1994 | Gifford |
| 5,622,294 | A | 4/1997 | Evans |
| 5,735,361 | A | 4/1998 | Forrest |
| 5,842,444 | A | 12/1998 | Perrulli |
| 6,006,968 | A | 12/1999 | McCarthy et al. |
| 6,027,001 | A | 2/2000 | Levitan |
| 6,039,333 | A | 3/2000 | Hamblin |
| 6,131,917 | A | 10/2000 | Walsh |
| 6,139,033 | A | 10/2000 | Western |

(Continued)

OTHER PUBLICATIONS

Wayback Machine, "Meet kidrunner," archived Jun. 10, 2013, retrieved from http://web.archive/org/web/20130610005753/http://kidrunners.com, on Dec. 19, 2015, 7 pages.

*Primary Examiner* — Kevin Hurley

(74) *Attorney, Agent, or Firm* — Seed IP Law Group PLLC

(57) ABSTRACT

A harness for pulling a carriage includes a waistband and a plurality of pressure-distributing plates. A pulling assembly for coupling the harness to the carriage includes a drawbar coupled to the carriage and a spring coupled to the drawbar and to the harness. A length and an angle of the spring are adjustable.

10 Claims, 3 Drawing Sheets

(56) References Cited

U.S. PATENT DOCUMENTS

| | | |
|---|---|---|
| 6,349,949 B1 | 2/2002 | Gorringe |
| 6,450,377 B1 | 9/2002 | Oriolo |
| 6,685,198 B1 | 2/2004 | Hartman |
| 7,007,956 B1 | 3/2006 | Pinon |
| 7,114,731 B2 | 10/2006 | Malrick |
| 7,246,802 B2 | 7/2007 | Yeung |
| 7,311,313 B1 | 12/2007 | Ray et al. |
| 7,422,223 B1 * | 9/2008 | Silliman ............... B62B 5/068 180/180 |
| 7,487,980 B2 | 2/2009 | Goddard et al. |
| 7,818,951 B1 | 10/2010 | Boutilier |
| 7,938,409 B2 | 5/2011 | Mejia |
| 8,091,899 B2 | 1/2012 | Mejia |
| 8,100,816 B2 * | 1/2012 | Daniel ............... A63B 21/0618 280/1.5 |
| 2001/0030402 A1 | 10/2001 | White |
| 2001/0043000 A1 | 11/2001 | Hinds |
| 2003/0067130 A1 | 4/2003 | Gordon |
| 2003/0111813 A1 | 6/2003 | Assaf et al. |
| 2004/0016781 A1 | 1/2004 | Smith |
| 2007/0187910 A1 | 8/2007 | Adams |
| 2008/0174078 A1 * | 7/2008 | Dooley ..................... A45F 3/08 280/1.5 |
| 2008/0238024 A1 | 10/2008 | Heidenreich et al. |
| 2008/0296326 A1 * | 12/2008 | Berlin ..................... A45F 3/14 224/184 |
| 2008/0296851 A1 * | 12/2008 | Hall ..................... B62B 5/068 280/1.5 |
| 2009/0057355 A1 * | 3/2009 | Weiss ..................... A45F 3/14 224/184 |
| 2009/0261540 A1 * | 10/2009 | Mejia ..................... B62B 5/068 280/1.5 |
| 2010/0204628 A1 | 8/2010 | Ghajar |
| 2012/0038124 A1 | 2/2012 | Newton, Jr. |
| 2014/0203529 A1 * | 7/2014 | Ortega ..................... B62B 1/10 280/47.25 |
| 2014/0265167 A1 * | 9/2014 | Mejia ..................... B62B 5/068 280/1.5 |

* cited by examiner

HARNESS AND PULLING ASSEMBLY

BACKGROUND

1. Technical Field

The present disclosure relates generally to a harness and pulling assembly, and more particularly to a harness designed to wrap around a person's waist and a pulling assembly designed to couple the harness to a carriage.

2. Description of the Related Art

When a person pulls a carriage by hand, the person's hands can act as hinges and the person's arms can act as springs to isolate the person's periodic or cyclic motions from the carriage. Periodic or cyclic motions of the person, such as when they walk, jog, or run to pull the carriage, include vertical motion (as the person lunges up and down) and horizontal motion (as the person surges forward with each step). Pulling a carriage by holding handles can be inefficient and uncomfortable due to differences between natural motions of the person and the carriage. For example, at fast gaits, such as when the person is running, the person's body can be impeded from moving through natural ranges of motion, and the person's arms can be impeded from swinging naturally. Thus, some hands-free pulling systems exist that connect pull-behind carriages to a person's waist or torso. Such hands-free pulling systems often inadequately isolate the person's periodic or cyclic motions from the carriage, and/or inadequately distribute resulting forces across the person's body.

BRIEF SUMMARY

An apparatus can be summarized as including a pull-behind rickshaw carriage having exactly two wheels, a rigid drawbar attached to the carriage, a spring mounted to the rigid drawbar, and a harness to be worn by a human, the harness attached to the spring.

The drawbar can be mounted rigidly to the carriage. A length of the spring can be adjustable. An angle of attachment of the spring to the drawbar can be adjustable. The spring is can be a leaf spring. The harness can be attached to the spring by a double axis hinge. The harness can include a pressure-distributing plate. The pressure-distributing plate can be rigid. The pressure-distributing plate can be rectangular. The pressure-distributing plate can be greater than 4 inches long and greater than 4 inches wide. The harness can include a waistband.

DETAILED DESCRIPTION

In the following description, certain specific details are set forth in order to provide a thorough understanding of various disclosed embodiments. One skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Figure 1:
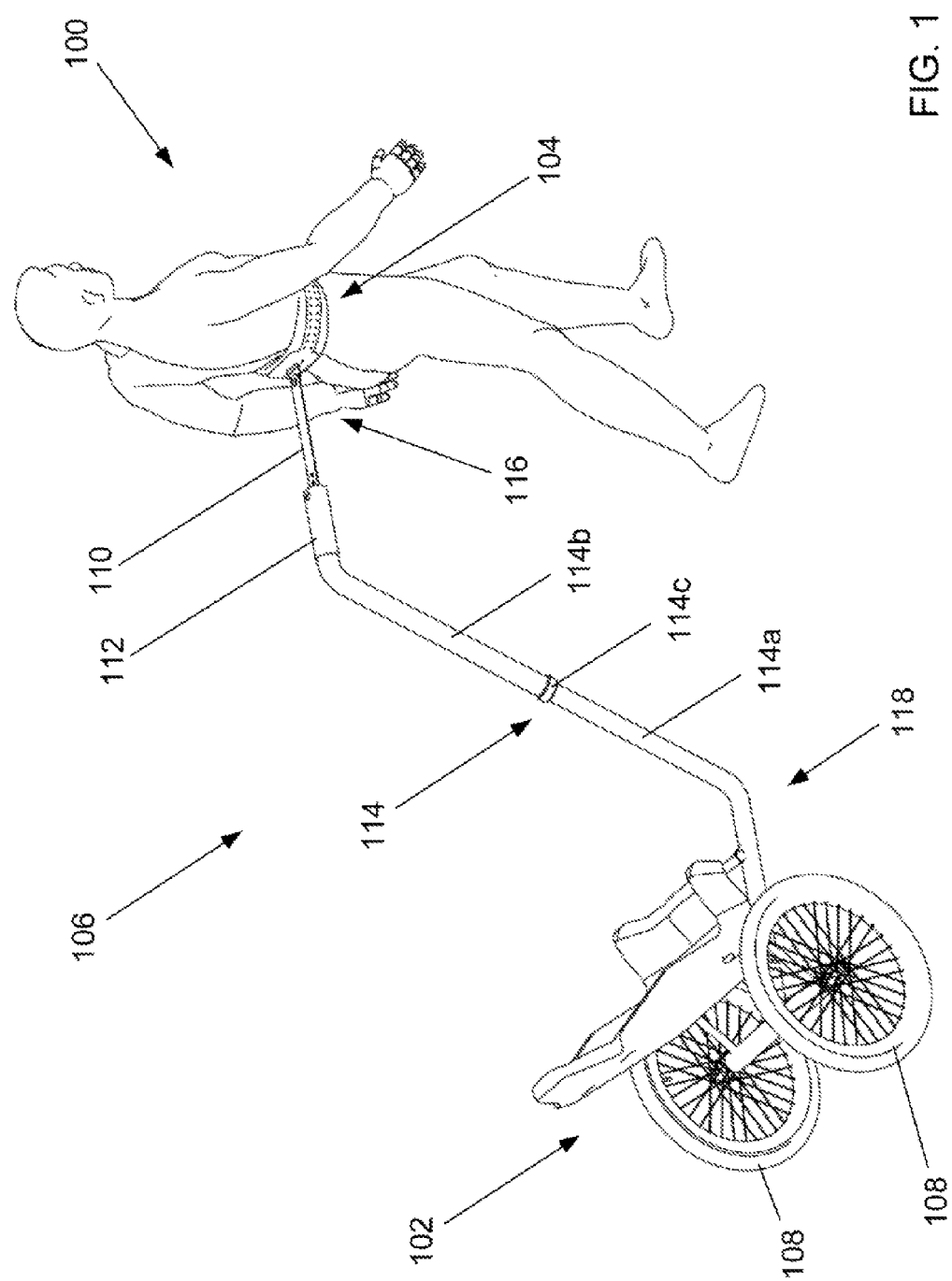
FIG. 1 is a perspective view of a person pulling a carriage using a harness and pulling assembly, according to at least one illustrated embodiment.

FIG. 1 illustrates a person (a human) 100 pulling or towing a pull-behind and hands-free carriage 102. More specifically, FIG. 1 illustrates the person 100 pulling the carriage 102 using a harness 104 coupled to their waist and a pulling assembly 106 coupled at a first, leading, or front end 116 proximate the person 100, to the harness 104, and coupled at a second, trailing, rear, or carriage end 118 proximate the carriage 102, to the carriage 102. The harness 104 and pulling assembly 106 can be used by the person 100 to pull the carriage 102 while doing daily activities such as child care, shopping at a grocery store, or running for exercise.

The carriage 102 can be a wheeled conveyance, cart, or trailer to be pushed or pulled by the person 100. The carriage 102 can be a two-wheeled rickshaw-type carriage 102, which can be a stroller such as a walking, jogging, or running stroller for carrying one or more children or animals, such as in seats in the carriage 102, or for carrying various goods. The carriage 102 can have exactly two, exactly three, exactly four, or more than four wheels 108. The weight of the carriage 102 can be balanced about an axle for the wheels 108, or the carriage 102 can be designed such that with a load in the carriage 102, the weight of the carriage 102 and the load together is balanced about the axle. In some implementations, the axle for the wheels 108 can be adjustable forwards and rearwards with respect to the rest of the carriage 102 such that a user of the carriage 102 can balance the weight of the carriage 102 and any load held within the carriage 102 about the axle. The carriage 102 can have a low center of gravity to prevent or reduce the likelihood of the carriage 102 tipping over.

The harness 104 includes a wearable device that can be worn by the person 100 and allows the pulling assembly 106 to be attached to the person 100. The harness 104 is designed to spread forces from the pulling assembly 106 over a significant area of the waist or torso of the person 100 to reduce discomfort to the person 100. For example, the harness 104 can include one or more (e.g., one, two, three, four, five, six, seven, eight, nine, ten, or more) pressure-distributing plates, which can also be referred to as weight-distributing or load-distributing plates. The harness 104 can include a belt, vest, jacket, and/or shoulder straps, as well as padding to further reduce discomfort to the person 100.

Figure 2:
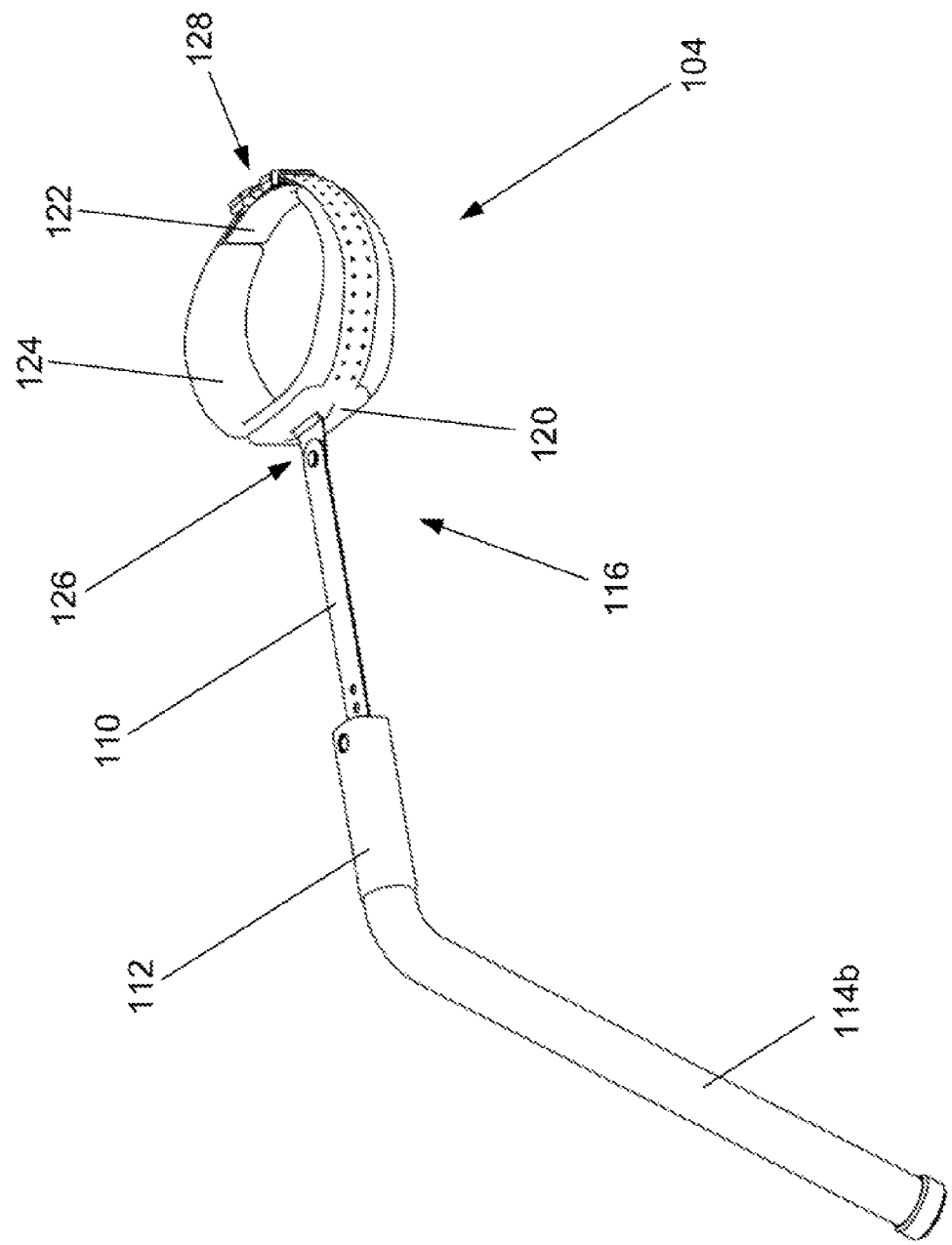
FIG. 2 is a perspective view of the harness and portions of the pulling assembly of FIG. 1, according to at least one illustrated embodiment.

As illustrated in FIG. 2, the harness 104 can include a rear pressure-distributing plate 120 configured to be positioned at the back of the torso of the person 100, a front pressure-distributing plate 122 configured to be positioned at the front of the torso of the person 100, and one or more (e.g., two) belts or straps 124 to couple the pressure-distributing plates 120, 122 to one another. Together, the plates 120, 122, and the straps 124 can form a waistband that wraps around the waist or torso of the person 100. The straps 124 can include one or more buckles 128 to allow the waistband to be secured to, and/or adjusted around, the waist of the person 100.

The pressure-distributing plates 120, 122 include padding and are configured to fit snugly against the body of the person 100 to reduce slipping of the harness 104 relative to the person 100, and to increase comfort, such as by reducing frictional wear against the body of the person 100. The padding can be breathable and allow heat dissipation from the person 100 to the surrounding environment. The pressure-distributing plates 120, 122 can be rigid and can be formed from rigid materials such as a metal, plastic, wood, carbon fiber, Kevlar™, or other rigid material. The pressure-distributing plates 120, 122 have square or rectangular shapes, with lengths and/or widths of at least 4, 5, 6, 7, 8, 9, or 10 inches.

The pulling assembly 106 includes a spring 110, a variable angle bracket 112, and a drawbar 114 including a lower drawbar portion 114a and an upper drawbar portion 114b telescopically adjustable relative to the lower drawbar portion 114a at a telescoping joint 114c. The spring 110 and the variable angle bracket 112 can be referred to together as a stabilizer. The drawbar 114 couples the carriage 102 to the harness 104 and thereby to the person 100. The drawbar 114 is rigid and formed from a rigid material such as carbon fiber, wood, plastics, or metals such as tubes of steel, aluminum, titanium, or their alloys. The drawbar 114 can have a length greater than 2, 2½, 3, or 3½ feet, or can have a length less than 5, 4½, 4, or 3½ feet. The drawbar 114 can have a length of about 3½ feet.

Figure 3:
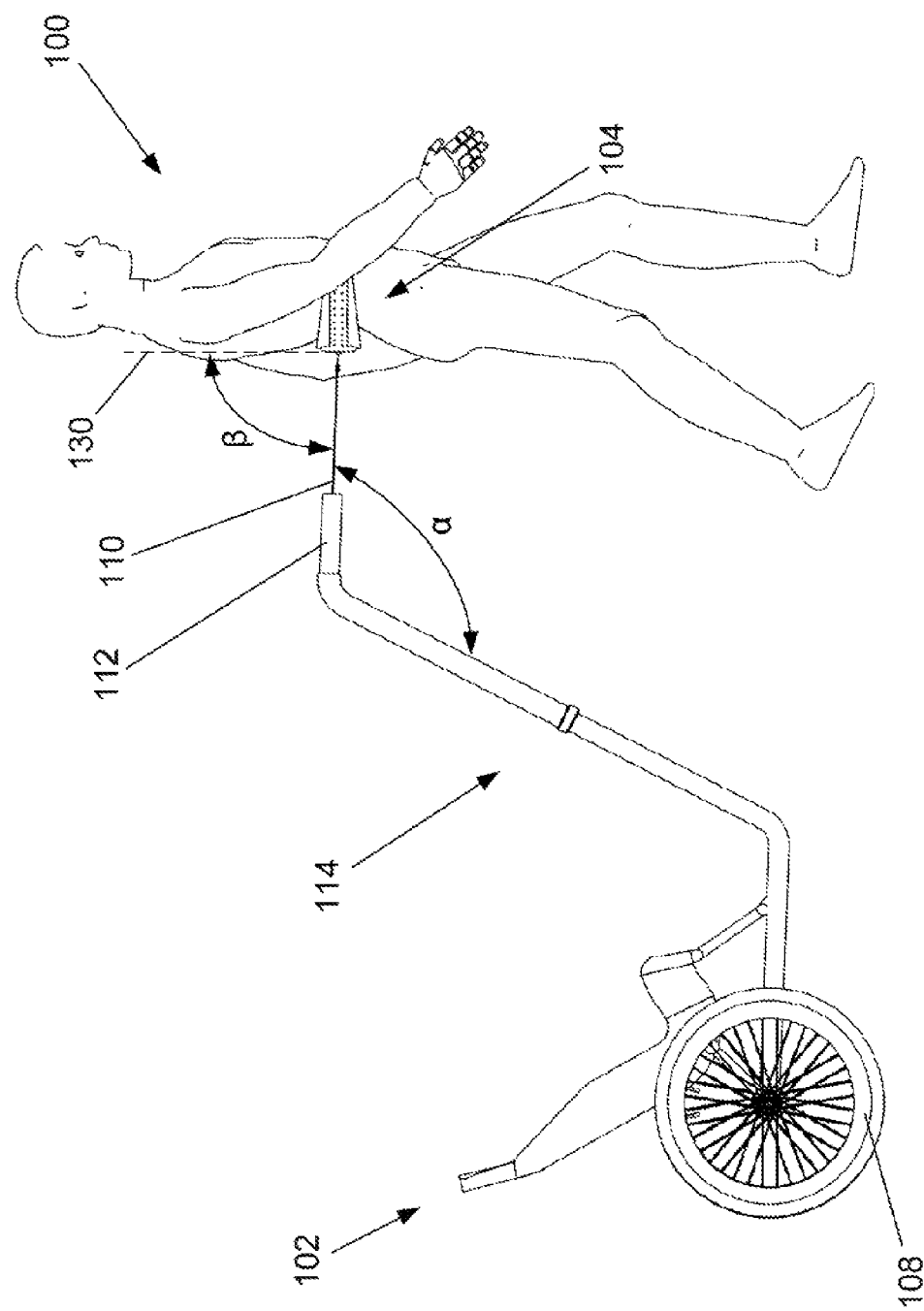
FIG. 3 is a side view of the person pulling the carriage using the harness and pulling assembly of FIG. 1, according to at least one illustrated embodiment.

The spring 110 can include one or more leaf springs, coil springs, hydraulic springs, and/or pneumatic springs coupled at a first end to the harness 104 and at a second end opposite the first end to the variable angle bracket 112. The spring 110 can be a leaf spring that is flexible (e.g., configured to bend) about a single horizontal bending axis perpendicular to its length, and can be rigid in a plane perpendicular to the single horizontal bending axis. Thus, the spring 110 can be rigid along its own length such that a length of the spring 110 remains substantially unchanged in response to compressive or tensile forces exerted along the length of the spring 110. Further, the spring 110 can be a vertically acting spring that isolates vertical motion of the person 100 from the drawbar 114 and the carriage 102. A length of the spring 110, a flexibility or stiffness of the spring 110, and an angle at which the spring 110 is coupled to the drawbar 114 (e.g., the angle α between the spring 110 and the drawbar 114 in FIG. 3) and/or to the person 100 (e.g., the angle β between the spring 110 and a vertical line 130 in FIG. 3) can be adjustable. As shown in FIG. 3, the angle β can be less than 90 degrees.

The spring 110 can at least partially decouple periodic or cyclic motion of the person 100 from the carriage 102. This can reduce or minimize shaking of the carriage 102 and any passengers or other items held therein, and can reduce discomfort to the person 100. The spring 110 can be flexible or elastic relative to the drawbar 114. The spring 110 can be formed from carbon fiber, plastics, or metals such as aluminum. The spring 110 can have a length greater than 1, 2, 3, 6, or 12 inches, or can have a length less than 24, 20, 18, 16, 14, or 12 inches. The spring 110 can have a length of about 12 inches. The drawbar 114 can have a length that is at least as long as the length of the spring 110. The drawbar 114 can have a length that is at least 2, 3, 4, 5, 10, 20, 30, 40, or 60 times as long as the length of the spring 110. In some implementations, maximizing the length of drawbar 114 relative to the length of the spring 110 can improve or optimize the effectiveness of the system.

The variable angle bracket 112 is coupled at a first end to the spring 110 and at a second end opposite the first end to the drawbar 114. The variable angle bracket 112 can be adjustable to allow adjustment of the length of the spring 110 and of the angle at which the variable angle bracket 112 is coupled to the drawbar 114, to allow adjustment of the angles α and β, at which the spring 110 is coupled to the drawbar 114 and/or to the person 100, respectively. For example, the length of the spring 110 can be selected or optimized to control a stiffness of the spring 110, such as to tune a resonant frequency of the pulling assembly 106 and carriage 102 (which can depend on the stiffness of the spring 110 and the weight of the mass of the carriage 102 including any items carried therein) to match or avoid matching a gait of the person 100. As another example, the angles α and β, at which the spring 110 is coupled to the drawbar 114 and/or to the person 100, respectively, can be selected or optimized such that effects of a vertical component of the periodic or cyclic motions of the person 100 are canceled or offset, or at least partially canceled or offset, by effects of a horizontal component of the periodic or cyclic motions of the person 100.

Various joints can be used to couple the carriage 102 to the drawbar 114, the drawbar 114 to the variable angle bracket 112, the variable angle bracket 112 to the spring 110, and the spring 110 to the harness 104. As examples, rigid joints or joints flexible or rotatable about a single one, exactly two, or three mutually orthogonal axes can be used to couple the various components to one another. As specific examples, the carriage 102 can be rigidly coupled to the drawbar 114, or can be coupled to the drawbar 114 by a hinge joint rotatable about a single axis, and the spring 110 can be coupled to the harness 104 by a double hinge joint 126 rotatable about exactly two orthogonal axes, such as a first, vertical axis and a second, horizontal axis perpendicular to the first axis and perpendicular to a length of the spring 110. The double hinge joint 126 can be a part of or directly coupled to the rear pressure-distributing plate 120 of the harness 104. The double hinge joint 126 can allow the person 100 to bend, kneel, turn to look back at the carriage 102, and otherwise move about relatively freely while wearing the harness 104.

The harness 104 and pulling assembly 106 can be designed to allow for compact storage. For example, any of the components herein can be telescoping or foldable so they can be made more compact for storage. The harness 104 and pulling assembly 106 can also be designed to be rapidly converted to allow the person 100 to push, rather than pull, the carriage 102, so the person 100 can pull the carriage 102 to a grocery store, push the carriage 102 through the store, and then pull the carriage 102 away from the store. For example, the double hinge joint 126 can be removed from the rear-pressure distributing plate 120 and coupled to the front pressure-distributing plate 122. A kit can include the carriage 102, the harness 104, the pulling assembly 106, and a set of instructions regarding methods of coupling the various components to one another and methods of adjusting the various components to improve or optimize performance.

In some implementations, the pulling assembly 106 includes a plurality of drawbars 114, a plurality of adjustable angle brackets 112, and/or a plurality of springs 110. In some implementations, the carriage 102 and/or the harness 104 can include a safety strap or other braking feature to prevent the carriage 102 from rolling away from the person 100 if the drawbar 114 becomes disconnected from the carriage 102 and/or the person 100, or if the person 100 loses control of the carriage 102. Any of the components described herein can be fabricated from lightweight, rigid, and strong materials such as carbon fiber, plastics, or metals such as aluminum, steel, or titanium, or combinations of such materials.

U.S. provisional patent application No. 62/087,853, filed Dec. 5, 2014, to which this application claims priority, is hereby incorporated herein by reference in its entirety. The various embodiments described above can be combined and modified to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus comprising:
   a pull-behind rickshaw carriage having exactly two wheels;
   a rigid drawbar attached to the carriage;
   a leaf spring mounted to the rigid drawbar; and
   a harness to be worn by a human, the harness attached to the leaf spring.

2. The apparatus of claim 1 wherein the drawbar is mounted rigidly to the carriage.

3. The apparatus of claim 1 wherein a length of the leaf spring is adjustable.

4. The apparatus of claim 1 wherein an angle of attachment of the leaf spring to the drawbar is adjustable.

5. The apparatus of claim 1 wherein the harness is attached to the leaf spring by a double axis hinge.

6. The apparatus of claim 1 wherein the harness includes a pressure-distributing plate.

7. The apparatus of claim 6 wherein the pressure-distributing plate is rigid.

8. The apparatus of claim 6 wherein the pressure-distributing plate is rectangular.

9. The apparatus of claim 6 wherein the pressure-distributing plate is greater than 4 inches long and greater than 4 inches wide.

10. The apparatus of claim 1 wherein the harness includes a waistband.

* * * * *